3,538,135
PROCESS FOR PREPARING STABILIZED FORMS OF TRIALKYNYL ALUMINUMS
Archie R. Young II, Montclair, and Robert Ehrlich, Morristown, N.J., assignors to Thiokol Chemical Corporation, Bristol, Pa., a corporation of Delaware
No Drawing. Filed June 15, 1964, Ser. No. 375,973
Int. Cl. C07f 5/06
U.S. Cl. 260—448                                   18 Claims This invention concerns the preparation of stabilized forms of trialkynyl aluminums.

More particularly, this invention relates to a novel process for preparing trialkynyl aluminum trialkylamine adducts having utility as intermediates for energetic propellant binders and as intermediates for preparing thermally stable polymers.

The novel process of this invention can be used to prepare adducts represented by the formula:

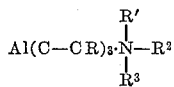

wherein R, R', $R^2$ and $R^3$ which can be the same or different are alkyl radicals.

The above adducts of this invention are useful as precursors in the preparation of polymeric substances, fuel binders in propellant formulations and as synthesis intermediates.

Aluminum per se is a high energy substance in propellant compositions. Similarly, the aluminum-hydrogen bond is a highly energetic linkage for propellant fuel binders. One of the more promising high energy sources of fuel binders would be compounds having acetylenic linkages and containing one or more moles of aluminum. This type of compound not only could be easily polymerized to high energy binders, but would possess other desirable characteristics. For example, unlike aluminum hydride, these compounds are generally soluble in hydrocarbon aliphatic or aromatic solvents and thus lend themselves to formulation in liquid propellants. For example, their solutions can be used as components of liquid propellants to potentiate or improve these propellants performance. Because of their acetylenic bonds these compounds are reactive intermediate in preparing other metallo-organics or derivatives of them. In addition, these polymer precursors can be polymerized readily and can be used as binders in solid propellant formulations, as well as additives in propellants formulations generally. When used for these purposes, the adducts can be used in the form of their solutions or can be added directly to liquid propellant formulations. Further, because of the presence of the highly reactive triple bond, these polymers can provide reactive sites for further extending the chain length and hence the molecular weight of the polymer. Finally these adducts can be cross linked with a variety of cross linking agents well known to the ploymer art to form more rigid polymers suitable for casting, molding, potting and the like.

With these uses in mind, it is an object of this invention to develop a process for preparing the above-described valuable acetylene adducts.

It is a further object to prepare an improved and alternative process for preparing trialkynylalane adducts.

It is a further object of this invention to provide a series of high energy polymer precursors containing aluminum that are suitable for incorporation into liquid or solid propellant formulations.

Other more varied objects and uses of the inventive compositions and their polymers will become apparent after a further reading of the Patent Application.

The above objects and others are achieved by preparing the trialkylamine adducts of trialkynylalanes particularly the triloweralkylamine adducts, through the novel process of this invention.

These adducts in the purified state are colorless solids, soluble in organic solvents generally except those which contain protonic hydrogens. For example, the adducts are soluble in benzene, aliphatic ethers, etc.

In practice an acetylenic reactant having at least one terminal and labile hydrogen is contacted with a trialkylamine alane co-reactant until substantial quantities of the acetylenic adduct product is prepared. Hydrogen gas is a by-product of the reaction. The adduct products can be isolated from the reaction mixture using solvent extraction or any other convenient isolation procedure practiced in the art. The main reaction course and its theoretical stoichiometry is shown below:

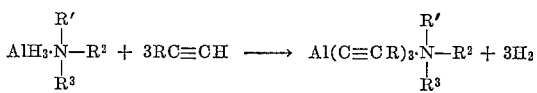

wherein R, R', $R^2$ and $R^3$ which can be the same or different are saturated alkyl radicals.

In one convenient embodiment of the inventive process, the trialkylamine alane reactant dissolved in an inert solvet is added to a vigorously stirred solution of the alkyne in an inert solvent until the evolution of hydrogen substantially ceases. During the course of the reaction the reaction mixture turns color. In the case of the triethylamine adducts products are a yellow color. The product depending upon physical state is either filtered, extracted or otherwise removed from the reaction mixture and dried to a final product. Alternatively, the product can be recrystallized or sublimed to yield a more highly purified product.

The reactants which can be used in the instant process offer a reasonable degree of latitude. For example, while any acetylene with a terminal hydrogen can be employed, the favored acetylenic reactants are those where the alkyl group in the molecule has 8 or less carbon atoms arranged in a straight chain. These acetylenes are the preferred acetylenic reactants for several reasons including more favorable yields, less contaminating side products, and the low cost and commercial availability of these starting materials. In addition, where the acetylenic adduct products are to be used as components of propellant formulations, the products having relative short alkyl groups in the acetylenic moiety are more highly energetic materials. However, acetylenes having longer straight chain alkyl radicals or isoalkyl radicals can be employed as reactants where other uses are contemplated. Cycloalkyl radicals or aryl radicals can be employed if steric hindrance does not prevent the adducts from being formed. The main restriction on the acetylenic reactants being that they possess no other reactive groupings or bonds. Thus, compounds containing other triple bonds or double bonds of a non-aromatic nature cannot be used as reactants. Illustrative acetylenes which can be used include among others: propyne, butyne, isobutyne, n-pentyne, the isopentynes, the isohexynes, n-hexyne, n-heptyne, the isoheptynes, n-octyne, the isooctynes, cyclohexylacetylene, benzylacetylene and the like.

Similarly, the trialkylamine alane reactant can be selected from a wide vareity of compounds. Examples of these compounds include among many others, those aminates in which all there alkyl substituents are alike such as: aluminum hydride trimetyhlaminate, aluminum hydride triethylaminate, the aluminum hydride tripentylaminates, the aluminum hydride trihexylaminates, aluminum tricyclohexylaminate and the like as well as aminates in which one or more of the three alkyl substituents are unlike. The latter include aluminum hydride ethyl dimethylaminate, aluminum hydride methylethylpropylaminate among others.

The preferred inert solvents which are used as the reaction media are the inert non-reactive aromatic solvents and substituted aromatic solvents. These include benzene, toluene, the xylenes among others.

Ordinarily the preparative reaction is run at near ambient temperatures and substantially atmospheric pressures. However, the temperature proceeds albeit slowly, at temperatures as low as about −10° C. and can be run at temperatures ranging up to about 85° C. Neither of the two temperature extremes is advantageous and the more narrow temperature range of about 20° C. to about 55° C. is preferred. Similarly sub- and superatmospheric pressures have a relatively unfavorable effect upon yield and promote the decomposition or side reactions of the reactants and products. For these reasons the preferred reaction conditions are from about 20° C. to about 55° C. at substantially atmospheric pressure.

Since the reaction time is dependent upon diverse factors such as the particular reactants used and the temperature and pressure utilized, it is difficult to set forth the reaction time precisely. Usually, however, the reactions are completed between 1–24 hours with 3–12 hours being the average when the preferred temperature range is employed.

As indicated above the reaction conditions of the inventive process are relatively flexible insofar as temperature, pressure and reactants are concerned. However, the ratio of the reactants is less flexible in some respects. For example, while in theory a stoichiometric ratio of the two components should yield the desired products, it has been found that a large excess of the acetylenic reactant is required for substantial yields of product. By a substantial excess is meant a molar ratio of from about 5 to 15 moles or more of the acetylenic reactant is used for each mole of alane reactant. For this reason this ratio represents the preferred ratio of the reactants.

As indicated previously one of the advantages of the inventive process is the mild reaction conditions employed. A further not insignificant advantage is the use of non-hazardous readily available reactants. For example, the acetylene and the substituted acetylenes are commercially available substances or they can be made by well known organic reactions. Two examples of this type of preparation of substituted acetylenes are the electrolysis of the alkali metal salts of dibasic organic acids or the reaction of treating an aldehyde or ketone with $PCl_5$ and heating the halogenated alkane with alcoholic potash or sodamide to form the acetylenic product.

The aluminum hydride trialkylaminates can be prepared by heating a slurry of an aluminum halide and lithium aluminum tetrahydride with the appropriate trialkylamine until a substantial amount of product is formed. A detailed description of this preparation can be found in copending Ser. No. 278,802 filed May 6, 1963.

In its composition aspects, the invention offers several advantages. For instance the adduct products are valuable intermediates for the preparation of polymeric substances.

A further advantage of these compositions lies in the use of their polymers as propellant binders and propellant additives.

Other advantages of these compositions lies in their adaptability to introduce aluminum in organic molecules and the creation of intermediates and polymers having a number of highly reactive sites.

Further advantages and a more detailed description of the invention in both its composition and process aspects may be seen from the illustrative examples submitted below.

EXAMPLE 1

Preparation of a tripropynylalane-triethylamine adduct

To a stirred solution of 100 parts by weight of benzene containing 40.0 parts by weight of propyne is added dropwise a solution of 100 parts by weight of benzene containing 13.1 parts by weight of triethylamine alane prepared by the method described in Ser. No. 278,802 filed May 6, 1963. During the addition of alane solution which takes several hours an inert atmosphere is maintained. The reaction can be followed visually by the appearance first of a pale yellow solution then later by the formation of a small amount of dark yellow precipitate. After the completion of the alane addition, propyne gas is passed through the reaction solution for one hour and the solution is filtered using an inert atmosphere. The yellow precipitate is discarded and the filtrate is retained. Upon freeze drying, the filtrate produced about 13 parts by weight of a yellow solid material which upon sublimation yields a white sublimate. Based upon the alane starting material an overall yield of 60% of product is obtained.

Hydrolytic analysis and infra-red analysis of the product confirms the structure of the white sublimate as the tripropynylalane triethylamine product,

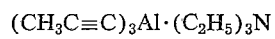

$$(CH_3C\equiv C)_3Al \cdot (C_2H_5)_3N$$

EXAMPLE 2

Preparation of a tripentynylalane-triethylamine adduct

A 90.9 ml. solution of 13.1 parts by weight of triethylamine alane in benzene is added to a reaction vessel equipped with stirring means. The alane is prepared by the method described in Example 1. A 68.0 parts by weight portion (100 ml.) of commercially derived pentyne-1 is slowly added to the stirred alane solution, all operations being conducted in a nitrogen atmosphere. After 4 hours the addition of pentyne is complete and the reaction mixture is purged of hydrogen by passing a stream of nitrogen through it. The resultant solution is clear but has a pale yellow color. The benzene and excess pentyne-1 are stripped off under vacuum leaving a pale yellow viscous liquid. The product is characterized by hydrolysis, infra-red and molecular weight (freezing point in benzene) as tripentynylalane-triethylamine.

A cut of the above described clear yellow solvent-free product is polymerized by heating to a dark brown non-volatile liquid. Some triethylamine is liberated during this process. This substance can be cured to a dark brown solid which can be used for potting or casting applications.

EXAMPLE 3

Preparation of a tripentynylalane-trimethylamine adduct

To a 100 ml. stirred solution of benzene containing 68 parts by weight of pentyne-1 is added dropwise a solution of 90.9 parts by weight of benzene containing 8.9 parts by weight of triethylamine alane prepared by the method described in Example 1. During the addition of alane solution which takes several hours an inert atmosphere is maintained. The reaction can be followed visually by the appearance first of a pale yellow solution then later by the formation of a small amount of dark yellow precipitate. After the completion of the alane addition, pentyne-1 gas is passed through the reaction solution for four hours and the solution is filtered using an inert atmosphere. The yellow precipitate is discarded and the filtrate is retained. Upon freeze drying, the filtrate produced a yellow solid material which upon sublimation yields a white sublimate. The physical constants of the product were the same as those obtained for the same product prepared by J. K. Ruff by the interaction of dipentynylmercury and trimethylamine alane reported in J.A.C.S. 83, 1798 (1961).

The foregoing examples are to be understood as being illustrative only. Numerous changes and modifications can be made in the reaction conditions, solvents and reactants without departing from the inventive concept.

We claim:

1. A process for preparing trialkynyl alane adducts, comprising contacting a trialkylamine alane reactant of the formula:

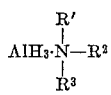

wherein R′, R² and R³ are alkyl radicals, with an acetylenic reactant of the formula:

$$RC \equiv CH$$

wherein R is an alkyl radical, until the evolution of hydrogen substantially ceases, and isolating the trialkynyl alane adducts contained therein.

2. A process for preparing trialkynyl alane adducts, comprising contacting a trialkylamine alane reactant of the formula:

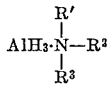

wherein R′, R² and R³ are alkyl radicals, with a stoichiometric excess of an acetylenic reactant of the formula:

$$RC \equiv CH$$

wherein R is an alkyl radical, in the presence of inert solvent, until the evolution of hydrogen substantially ceases, and isolating the trialkynyl alane adducts contained therein.

3. The process of claim 2 wherein the inert solvent is aromatic and the reaction is run in an inert atmosphere.

4. The process of claim 3 wherein the inert solvent is benzene.

5. A process for preparing trialkynyl alane adducts, comprising contacting a trialkylamine alane reactant of the formula:

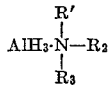

wherein R′, R² and R³ are alkyl radicals having from 1–8 carbon atoms, with an acetylenic reactant of the formula:

$$RC \equiv CH$$

wherein R is an alkyl radical, in an inert atmosphere in the presence of an inert solvent until the evolution of hydrogen substantially ceases, said reactants being present in the ratio of about one mole of trialkylamine alane to about five to 15 moles of acetylenic reactant, and isolating the adduct contained therein.

6. The process of claim 5 wherein the inert solvent is aromatic.

7. The process of claim 5 wherein the trialkylamine alane reactant is trimethylamine alane.

8. The process of claim 5 wherein the trialkylamine alane reactant is triethylamine alane.

9. The process of claim 5 wherein the trialkylamine alane reactant is tripropylamine alane.

10. The process of claim 5 wherein the trialkylamine alane reactant is a tributylamine alane.

11. The process of claim 5 wherein the trialkylamine alane reactant is a tripentylamine alane.

12. The process of claim 5 wherein the trialkylamine alane reactant is a trihexylamine alane.

13. The process of claim 5 wherein the reactants are trimethylamine alane and propyne.

14. The process of claim 5 wherein the reactants are triethylamine alane and propyne.

15. The process of claim 5 wherein the reactants are trimethylamine alane and butyne-1.

16. The process of claim 5 wherein the reactants are triethylamine alane and butyne-1.

17. The process of claim 5 wherein the reactants are triethylamine alane and pentyne-1.

18. The process of claim 5 wherein the reactants are trimethylamine alane and pentyne-1.

References Cited

UNITED STATES PATENTS

| | | | |
|---|---|---|---|
| 3,136,667 | 6/1964 | D'Alelio | 260—448 X |
| 3,149,136 | 9/1964 | Bruce et al. | 260—448 |
| 3,255,224 | 6/1966 | Ziegler et al. | 260—448 |

LELAND A. SEBASTIAN, Primary Examiner

U.S. Cl. X.R.

149—109